Figure 1:
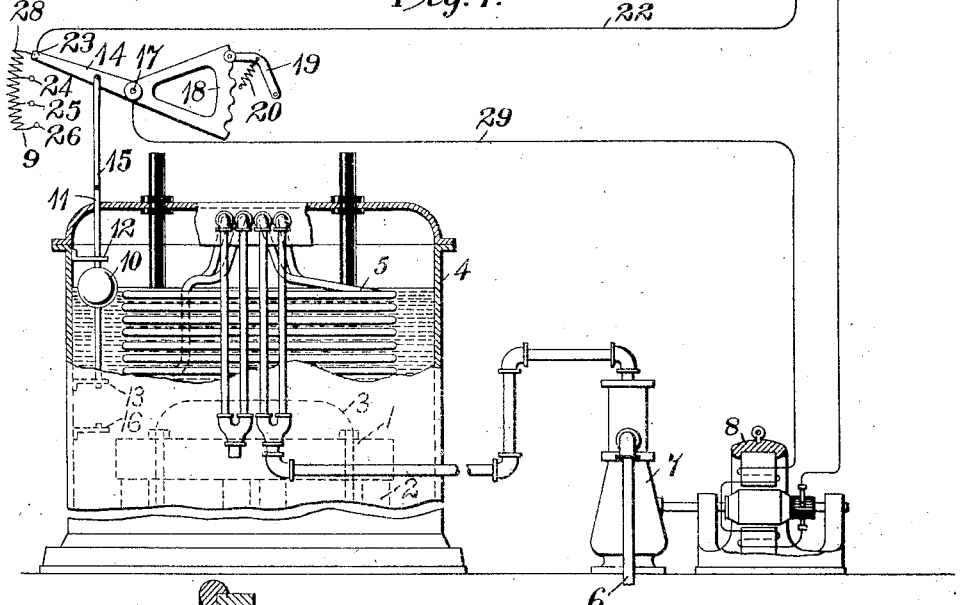

No. 853,263. PATENTED MAY 14, 1907.
K. C. RANDALL.
COOLING SYSTEM.
APPLICATION FILED MAY 2, 1906.

2 SHEETS—SHEET 1.

WITNESSES:
Fred H. Miller
R. P. Dearborn

INVENTOR
Karl C. Randall
BY Wesley G. Carr
ATTORNEY

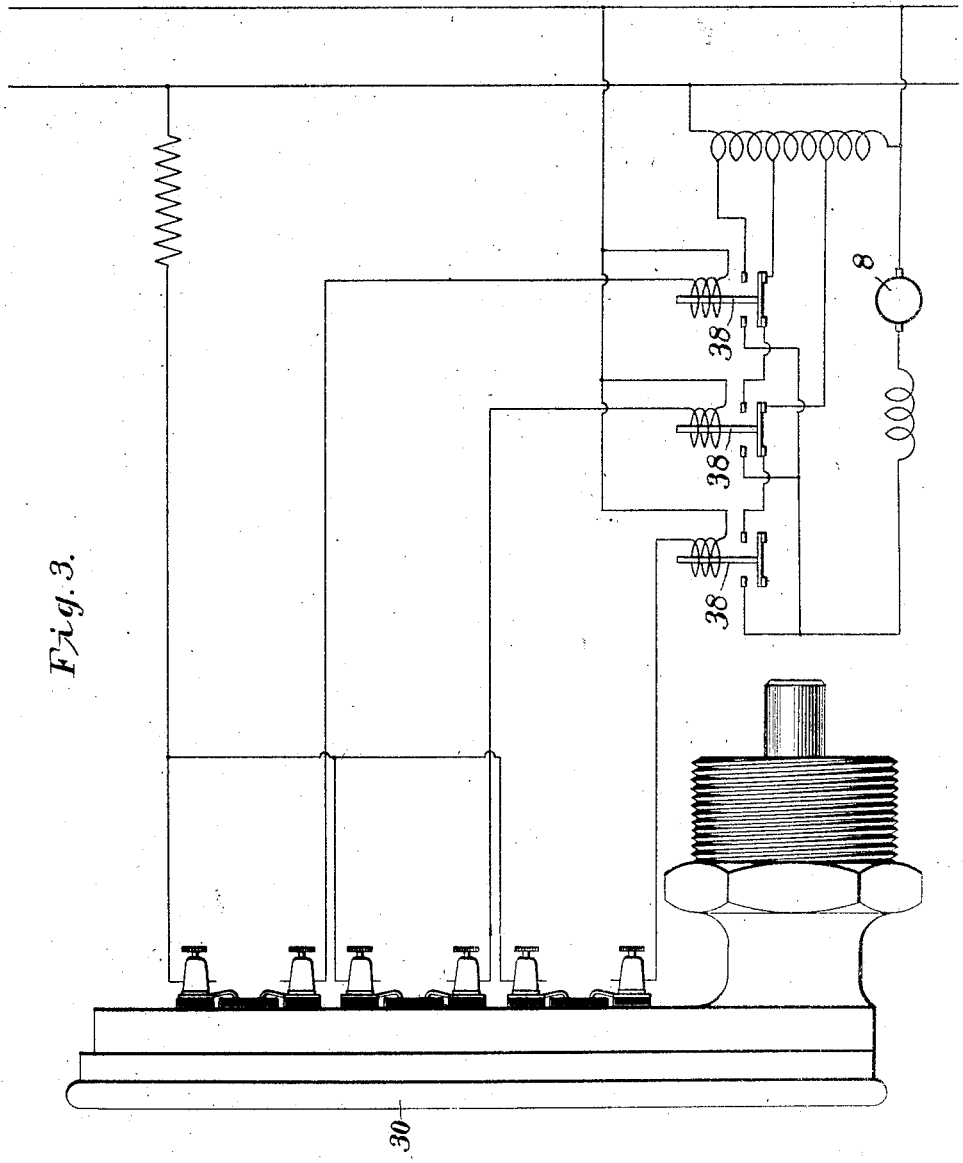

UNITED STATES PATENT OFFICE.

KARL C. RANDALL, OF EDGEWOOD PARK, PENNSYLVANIA, ASSIGNOR TO WESTINGHOUSE ELECTRIC & MANUFACTURING COMPANY, A CORPORATION OF PENNSYLVANIA.

COOLING SYSTEM.

No. 853,263.         Specification of Letters Patent.         Patented May 14, 1907.

Application filed May 2, 1906. Serial No. 314,874.

*To all whom it may concern:*

Be it known that I, KARL C. RANDALL, a citizen of the United States, and a resident of Edgewood Park, in the county of Allegheny and State of Pennsylvania, have invented a new and useful Improvement in Cooling Systems, of which the following is a specification.

My invention relates to cooling systems and has special reference to the regulation of such systems as are adapted for use with electrical apparatus.

The object of my invention is to provide means for automatically regulating the amount of energy utilized for cooling electrical apparatus, that shall be simple in arrangement and dependent upon the temperature of the apparatus to which the system is applied.

It is desirable to provide means for cooling electrical apparatus in order that the insulation which is applied to the current-carrying conductors may not be overheated and destroyed and in order to keep the electrical performances and resistance of the apparatus normal.

When electric generators and transformers are subjected to continuous service it is necessary, or at least desirable, to provide some means for conducting away the heat generated in the cores and the windings. The core structure and the coils may be so constructed and arranged as to permit the circulation of suitable insulating fluid through the electrically and magnetically active parts. Air or other suitable gas may be forced through the apparatus by suitable propellers, or, as is often the case with transformers, the parts may be immersed in insulating fluid, such as oil, and the temperature of the fluid be kept normal by providing coils of pipe through which a cooling fluid, such as water, may be circulated.

I provide means for automatically regulating the degree of cooling effect by regulating the amount of the cooling fluid admitted to the system as the temperature of the cooled apparatus varies and, in the cooling systems described, motor driven fluid-propellers are employed, the amount of cooling being varied by regulating the speed of the motors. This result may be approximated by regulating the speed of the fluid-propeller as the energy delivered from the electrical apparatus varies, since the temperature existing in the apparatus is largely dependent upon this factor. Electrical apparatus in general, however, may be subjected for short intervals of time to considerable overloading without injury and without overheating the windings or core and, furthermore, the temperature of the parts may be affected by climatic conditions which may determine the temperature of the air in the vicinity so that the regulation of the cooling system may preferably be depend on upon the temperature actually existing in the apparatus.

My invention is illustrated in the accompanying drawings in which

Figure 2:
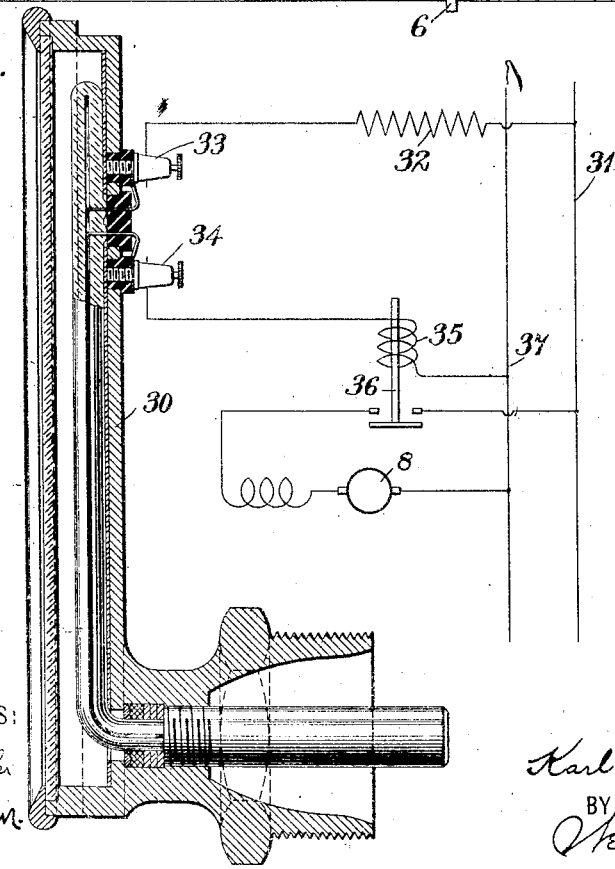

Figure 1 is a view, partially in side elevation, partially in section and partially diagrammatic, of a system arranged in accordance therewith, in which the cooled apparatus is an oil-immersed transformer, the cooling medium being water that is circulated, by means of a pump, through coils of pipe submerged in the oil. Figs. 2 and 3 are views, mainly diagrammatic, showing the circuit connections for modified systems which embody my invention.

Referring to Fig. 1 of the drawings, a transformer 1, comprising a magnetizable core member 2 and windings 3, is located in a tank 4 and immersed in an insulating fluid, such as oil. The temperature of the oil in the tank 4 may be reduced by means of a coil of pipe 5 located in the oil above the transformer and supplied with water, or other suitable cooling fluid, from any convenient source, through a feed pipe 6 by means of a pump or propeller 7. The pump 7 is driven by an electric motor 8 which may be energized from a supply line *a—b* and the speed of which may be regulated by means of a rheostat 9. In order to effect the automatic regulation of the motor speed in accordance with the temperature of the oil in the tank 4, a float 10 is utilized which is attached to a vertical rod 11 and rises and falls as the oil in the tank expands and contracts by reason of temperature variations. The rod 11 is mounted in bearings 12 and 13 which are supported from the side wall of the tank 4, its upper end being connected to a movable contact arm 14 of the rheostat 9 by means of a link 15, and its motion being limited, in a downward direction, by a stop 16. The movable contact arm 14 is pivoted upon a stationary shaft 17 and is provided with a notched cam projection 18 which is engaged by a pawl 19. The pawl 19 is held in engagement with the periphery of the cam 18 by a spring 20 and serves to accentuate a plurality of positions which the contact arm is adapted to occupy. When the float 10 is in its lowermost position, the circuit $a$—$b$ is interrupted at the arm 14 but if the level of the oil rises, by reason of an increase in temperature, the arm 14 is moved into successive engagement with a plurality of stationary contact members 23, 24, 25 and 26. When the arm occupies any one of these positions, the circuit is completed from conductor $a$ through conductor 22, more or less of the resistance sections 28 which are interposed between the several stationary contact members, contact arm 14, conductor 29, and motor 8 to the conductor $b$. In this way, the speed of the motor may be automatically regulated as the oil in the tank expands and contracts and since this expansion and contraction is due to the variations in the temperature existing in the transformer, the amount of water circulated through the coil 5 by means of the pump 7 is automatically determined by the temperature existing in the transformer.

Referring to Fig. 2, the float mechanism for regulating the speed of the motor of Fig. 1 is replaced by a contact thermometer 30. When the temperature of the transformer or other apparatus to which the system is applied exceeds a predetermined amount, electrical contact is completed from a line conductor 31 through suitable resistance 32, contact terminals 33 and 34 of the thermometer 30, magnet winding 35 of an electrically-operated switch 36 to opposite line conductor 37. The energizing of the winding 35 closes the switch 36 and energy is supplied therethrough to the motor 8. In this way, the speed of the motor is not varied but the motor itself is started and stopped as the temperature rises above or falls below a predetermined value.

The system illustrated in Fig. 3 is similar to that of Fig. 2 except that a plurality of contact terminals are provided at different heights along the thermometer 30, the several pairs of which are connected with electrically-operated switches 38. In this way, the switches are successively closed as the temperature rises and are so arranged as to effect an increase in the voltage applied to the motor 8. This may be accomplished either by short-circuiting the sections of a resistance connected in series with the motor or by successively supplying energy from different voltage taps of a transformer, according to well known methods.

Although I have illustrated the cooling system of my invention in connection with an oil-insulated, water-cooled transformer, for the sake of clearness, its use is in no way restricted to such apparatus and may readily be applied to any kind of apparatus in which it is desirable to maintain a substantially constant temperature, and I desire that only such limitations shall be imposed as are indicated in the appended claims. It will be further understood that the circulation of the cooling fluid is not necessarily effected by means of a propeller but may be supplied from a pressure tank or reservoir and the flow regulated as the temperature of the cooled apparatus varies.

I claim as my invention:

1. In a cooling system, the combination with a propeller for forcing a cooling fluid through said system, of means for controlling the operation of said propeller, said means being governed by the temperature of the apparatus or material to which the system is applied.

2. The combination with a transformer, and a tank containing an insulating liquid in which the transformer is submerged, of a coil of pipe in said liquid, a propeller for forcing a cooling liquid through said coil, and a controller for said propeller the operation of which is governed by the temperature of said insulating liquid.

3. The combination with a transformer, and a tank containing an insulating liquid in which the transformer is submerged, of a coil of pipe in said tank, a pump for forcing a cooling fluid through said coil, a motor for driving said pump and a controlling means for said motor the operation of which is governed by the expansion and contraction of the insulating liquid as it is heated and cooled.

4. The combination with a transformer, and a tank containing an insulating liquid in which the transformer is submerged, of a coil of pipe in said tank, a pump for forcing a cooling liquid through the coil, an electric motor for driving the pump, and a controller for the electric motor the operation of which is governed by the rise and fall of the insulating liquid under changes in its temperature.

5. In a cooling system, the combination with a fluid-propeller, of means for automatically varying the speed of the propeller as the temperature in the apparatus to which the system is applied varies.

6. The combination with a fluid-propelling system for cooling purposes and an electric driving motor therefor, of means for varying the voltage applied to the motor in accordance with the variations in the temperature of the system.

7. In a fluid-propelling system for cooling purposes, the combination with an electric driving motor and resistance therefor, of a temperature indicator and means for varying the resistance included in circuit with the motor in accordance with the rise and fall of the indicator.

8. In a cooling system, the combination with a temperature indicator, pairs of contact terminals arranged to be electrically connected as predetermined temperatures are indicated, of a fluid-propeller, an electric driving motor therefor and means for controlling the speed of the motor.

9. In a cooling system, the combination with a temperature indicator, a fluid-propeller and an electric driving motor therefor, of pairs of contact terminals that are successively connected as the temperature increases, and means for automatically controlling the speed of the motor as the temperature rises.

10. In a cooling system, the combination with a temperature indicator, pairs of contact terminals arranged to be electrically connected as predetermined temperatures are indicated, of a fluid-propeller, an electric driving motor therefor, a voltage regulator for the motor, and a plurality of electro-responsive devices that determine the voltage applied to the motor and are energized as the indicating terminals are connected.

11. In a cooling system, the combination with a temperature indicator, pairs of contact terminals arranged to be electrically connected as predetermined temperatures are indicated, of a fluid-propeller, an electric driving motor therefor, a regulating transformer for the motor, electrically operated switches which determine the voltage applied to the motor, operating magnets therefor which are successively energized to close the switches and increase the motor speed as the temperature increases.

12. The combination with an electric motor and a temperature indicator, of means for automatically increasing or desceasing the motor speed as the indicator registers a higher or a lower temperature.

In testimony whereof, I have hereunto subscribed my name this 30th day of April, 1906.

KARL C. RANDALL.

Witnesses:
J. S. WILLIAMS,
BIRNEY HINES.